Patented Aug. 25, 1953

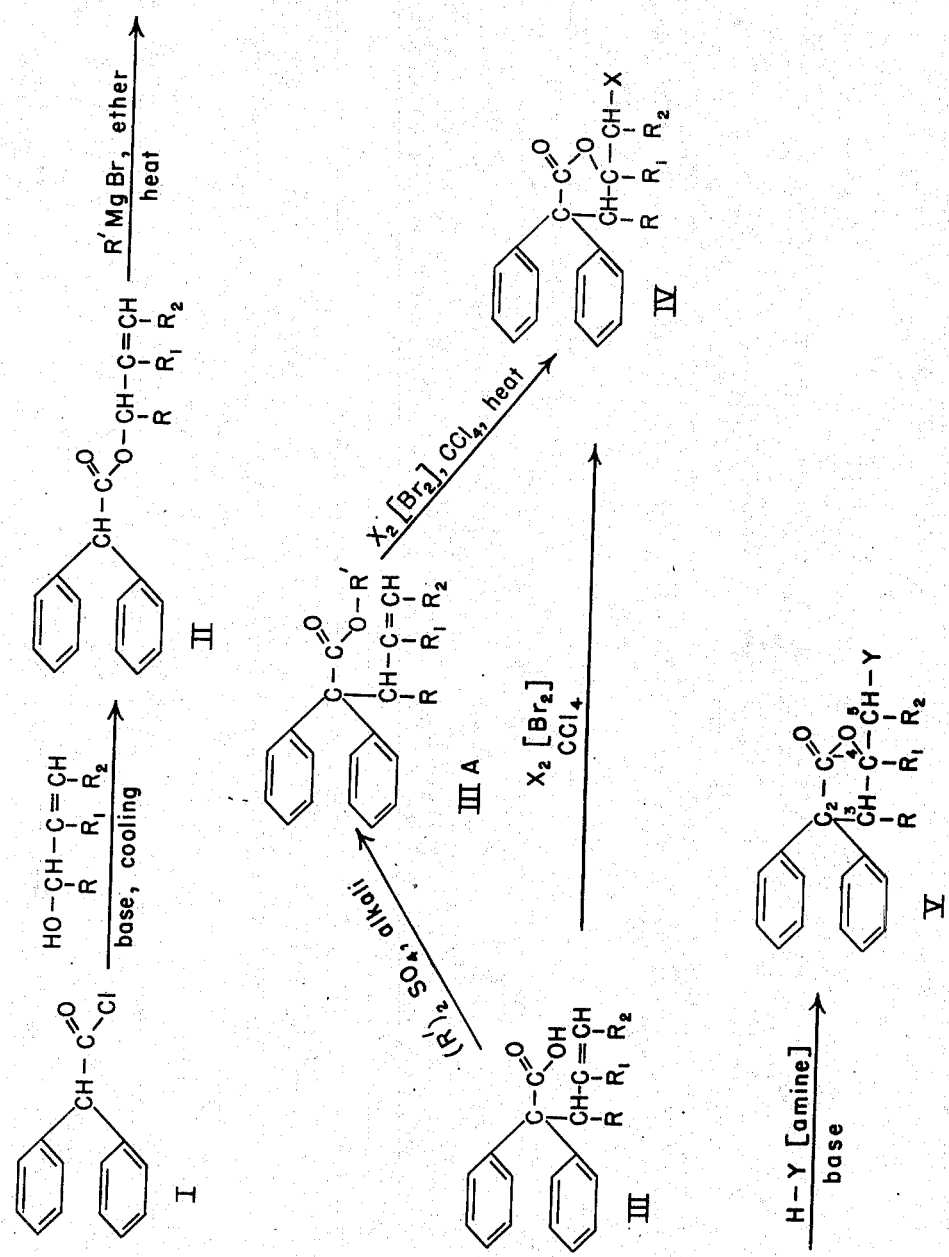
INVENTOR.
Richard T. Arnold &
Glenn E. Ullyot

2,650,231

UNITED STATES PATENT OFFICE 2,650,231

AMINOVALEROLACTONES AND METHOD FOR THEIR PRODUCTION

Richard T. Arnold, Minneapolis, Minn., and Glenn E. Ullyot, Philadelphia, Pa., assignors to Smith, Kline & French Laboratories, Philadelphia, Pa., a corporation of Pennsylvania Application November 19, 1949, Serial No. 128,406

7 Claims. (Cl. 260—294.7)

This invention relates to certain new chemical compounds, more particularly to aminovalerolactones, and to method for their production.

The compounds contemplated by this invention possess certain physiological properties and will be found to have utility as local anesthetic and antispasmodic agents.

The drawing illustrates procedure for the preparation of the compounds of this invention and the structunre of the starting material and the several intermediates.

From the broad standpoint the compounds according to this invention will have the following structure:

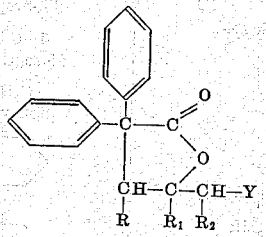

in which R, $R_1$, $R_2$, having not in excess of one carbon atom are selected from the group consisting of H and $CH_3$; Y is a nitrogen-linked amino radical selected from the group consisting of heterocyclic, primary, secondary and tertiary amino radicals, the substituents of the secondary and tertiary amino radicals being selected from the group consisting of alkyl and substituted alkyl.

Organic and inorganic salts of said compounds, as for example, hydrochlorides, hydrobromides, sulfates, phosphates, tartrates, succinates, and the like, are contemplated as being within the scope of this invention.

More specifically, compounds according to this invention will have the following structure:

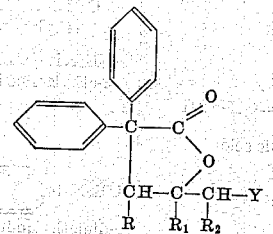

in which R, $R_1$, $R_2$, having not in excess of one carbon atom, will be selected from the group consisting of H and $CH_3$; Y is a nitrogen-linked amino radical selected from the group consisting of heterocyclic, primary, secondary, and tertiary amino radicals, the substituents of which are selected from the group consisting of alkyl having not in excess of ten carbon atoms, substituted alkyl the alkyl portion of which is not in excess of five carbon atoms, and substituents of which are selected from the group consisting of hydroxy, halogen, and salts formed by interaction with inorganic and organic acids having an ionization constant not less than $1.8 \times 10^{-5}$ at 18° C.

In the following description where the symbols R, $R_1$, $R_2$ and Y are used, they will have the significance ascribed to them respectively in connection with the general formulae above.

The compounds according to this invention will be prepared from diphenylacetyl chloride by a series of reactions as described below, using techniques well known to the art, all of which will be made apparent from the following description with reference to the accompanying drawing.

STEP I

Diphenylacetyl chloride (compound I) is treated with an appropriate allyllic alcohol (all of which are known or will be readily prepared) variously in the absence of or in the presence of a suitable solvent such as, for example, carbon tetrachloride or chloroform, to prepare the allyllic ester of diphenyl acetic acid (compound II). The reaction is carried out in the presence of an acid binding agent such as pyridine, and at ordinary or lower temperatures. The product of this reaction is isolated by distillation of the reaction mixture.

STEP II

An intramolecular rearrangement of the allyl ester of diphenylacetic acid (compound II) is effected through the use of a Grignard reagent such as mesityl magnesium bromide, to form the corresponding 2,2-diphenyl-4-pentenoic acid (compound III). This reaction may be carried out in the presence of anhydrous ether; the product of which will be isolated by distillation.

The reaction may also be carried out using sodium hydride in place of a Grignard reagent, and benzene in place of ether.

STEP III

Treatment of the above formed pentenoic acid (compound III) with a halogen such as, for example, $Br_2$, will effect a ring closure to form the bromo derivative of the five membered heterocyclic valerolactone, compound IV. This reaction will be carried out with a solvent such as carbon tetrachloride and may be carried out at normal or elevated temperatures.

The 2,2 - diphenyl - 5 - bromo-4-valerolactone, compound IV, may also be formed by an alternate method shown in which the pentenoic acid, compound III, will be esterified via an alkali salt with the use of a dialkyl sulfate, as, for instance, dimethylsulfate.

The resulting ester of the pentenoic acid, compound IIIA, will then be treated in a manner identical with that above described in the procedure for the treatment of the acid itself to form the same bromovalerolactone.

STEP IV

The desired aminovalerolactone, compound V, will be prepared from the halovalerolactone, compound IV, formed above by reacting the halo compound with the appropriate amine at normal or elevated temperatures and in the presence or absence of suitable solvents as dictated by the nature of the starting material. An acid binding agent such as pyridine, potassium carbonate, or an excess of the reacting amine will be used to carry out the reaction for the preparation of the 2,2-diphenyl-5-amino-4-valerolactone, compound V.

The preparation of primary or secondary aminolactones may best be effected through selection of an appropriate dibenzyl or mono-benzyl amine, respectively, for reaction with the halolactone as above described. The resulting dibenzyl or monobenzylaminolactone is then cleaved by hydrogenolysis to form the corresponding primary or secondary amine. The debenzylation is carried out with the aid of a noble metal catalyst, as for example, palladium, platinum, etc., involving techniques which are well known to the art.

The following tabulation will be illustrative of acids and amines used in the preparation of the compounds according to this invention and will serve to make apparent the requisite acids and amines (which are known or readily prepared) for producing all of said compounds, it being noted that any of the acids shown may be combined with all of the amines shown:

STARTING MATERIALS

| Acids | Amines |
|---|---|
| 2,2-diphenyl-4-pentenoic acid | $(CH_3)_2NH$ dimethylamine |
| 2,2-diphenyl-4-methyl-4-pentenoic acid | $(C_2H_5)_2NH$ diethylamine |
| 2,2-diphenyl-3-methyl-4-pentenoic acid | $(nC_3H_7)_2NH$ di-n-propylamine |
| 2,2-diphenyl-4-hexenoic acid | $(i-C_3H_7)NH$ di-isopropylamine |
| | $(C_4H_9)_2NH$ dibutylamine |
| | piperidine |
| | morpholine |
| | $C_8H_{17}NH$ octylamine |
| | $C_{12}H_{25}NH_2$ dodecylamine |
| | $CH_3NH(C_6H_5)$ N-methylaniline |
| | $CH_3NH(CH_2C_6H_5)$ methylbenzylamine |
| | $C_2H_5NH(CH_2C_6H_5)$ ethylbenzylamine |
| | $(C_6H_5CH_2)_2NH$ dibenzylamine |
| | $C_2H_5NH(CH_2CH_2OH)$ ethylamino-ethanol |
| | $C_2H_5NH-CH_2CH_2N(CH_3)_2$ β-ethylaminodimethylamine |
| | $CH_3NH-\langle\rangle-N(CH_3)_2$ p-dimethylamino N-methylaniline |
| | $C_6H_5-CH_2-CH-CH_3$ \| $NH_2$ 1-phenyl-2-aminopropane |

SPECIFIC EXAMPLES

The following specific examples of compounds in accordance with this invention and having the structure as defined above in the general formulae and of their preparation, together with the foregoing disclosure, will make apparent the structure of all of the compounds contemplated by this invention and procedure for their preparation.

*Example I.—2,2 - diphenyl - 5 - dimethylamino-4-valerolactone hydrochloride*

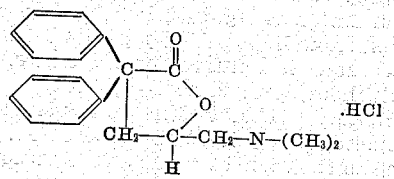

STEP I

Allyl diphenylacetate is prepared by adding slowly a solution of 35 grams of diphenylacetyl chloride in 23.3 ml. of chloroform to a solution of 10 grams of allyl alcohol and 15 grams of pyridine in 20 ml. of chloroform. The addition is carried out slowly with constant stirring, the reaction mixture being maintained at 0–5° C. After the reaction mixture is allowed to stand overnight, it is washed with successive portions of 5% HCl, 5% NaOH, and water. The solution is then dried over some hygroscopic agent such as sodium sulfate, filtered, and the solvent removed by distillation. The allyl ester so isolated is obtained as a colorless liquid distilling at 161–162° C. at 3 mm. of pressure.

STEP II

The mesityl Grignard reagent prepared from 25 g. of bromomesitylene, 3.1 g. of magnesium turnings, 0.05 g. of magnesium powder, and 75 ml. of anhydrous ether in the usual manner, is added with stirring to a solution of 25 g. of allyl diphenylacetate and 50 ml. of anhydrous ether. The reaction mixture is refluxed one hour after completion of addition, and after being allowed to stand overnight at room temperature, it is decomposed with slightly acidified ammonium chloride solution. The ether solution is extracted thoroughly with 5% sodium hydroxide.

Acidification of the aqueous alkaline extracts yields a yellow oil which solidifies after standing a few minutes, forming crystals of 2,2-diphenyl-4-pentenoic acid. Recrystallization from alcohol and water raises its M. P. to 140–142° C.

It may be noted that NaH in benzene or phenyl MgBr in ether can be used as bases in the rearrangement instead of mesityl magnesium bromide.

STEP III

A mixture of 60 g. of 2,2-diphenyl-4-pentenoic acid and 350 ml. of carbon tetrachloride is stirred vigorously during the addition of 38.4 g. of bromine over a fifteen minute period. The reaction heats to 50° spontaneously. The carbon tetrachloride (300 ml.) is distilled at atmospheric pressure. The residue is washed with warm sodium carbonate solution, separated and the residual carbon tetrachloride is evaporated on the steam bath. The residue is recrystallized from ethanol and water; (M. P. 87–89° corr.). Addition of water to the filtrate affords a second crop of crystals of light yellow color. A third crop is obtained on further dilution. The second and third crops are combined and recrystallized from ethanol and water to give more bromolactone, melting at 85–86°.

STEP IV

A mixture of 7.0 g. of 2,2-diphenyl-5-bromo-4-valerolactone, 50 ml. of 25% aqueous dimethylamine, and 30 ml. of 95% alcohol is heated in a closed vessel to 150° for three hours. Evaporation on the steam bath to a volume of 35 ml., followed by addition of water, causes an oily product to separate. This is taken up in ether and washed three times with water. After drying over calcium chloride, hydrogen chloride is added to the ethereal solution. Recrystallization of the resulting precipitate from alcohol and ether gives white crystals of 2,2-diphenyl-5-dimethylamino - 4 - valerolactone hydrochloride melting at 223–225°. The product is recrystallized from alcohol and ether; M. P. 224–225°.

The 2,2-diphenyl-5-bromo-4-valerolactone as prepared in Step III is also prepared by reacting the methyl ester of 2,2-diphenyl-4-pentenoic acid in a manner identical with that used in Step III. The ester itself is prepared from the pentenoic acid as follows:

A solution of the potassium salt of 2,2-diphenyl-4-pentenoic acid is prepared from 5.25 g. of potassium hydroxide and 20.0 g. of 2,2-diphenyl-4-pentenoic acid in 80 ml. of water. The water is removed by azeotropic distillation with xylene. After all the water is removed, 10.0 g. of dimethylsulfate is added and the mixture is stirred at reflux for two hours. On cooling, water is added and the layers are separated. The xylene layer is extracted once with water and the organic layer is dried over calcium chloride. The xylene is removed by distillation leaving crude methyl ester. A sample is redistilled for analysis, boiling point 154–161°/14 mm.

The bromvalerolactone formed through the reaction of the above ester with free bromine is identical in every manner with the product formed by the reaction of the pentenoic acid as in Step III.

*Example II.—2,2-diphenyl-5-diethylamino-4-valerolactone hydrochloride*

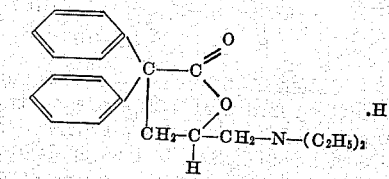

The 2,2 - diphenyl - 5 - bromo-4-valerolactone used as a starting material in the preparation of this compound is described as an intermediate in the preparation of Example I (Step III).

A mixture of 14.0 g. of 2,2-diphenyl-5-bromo-4-valerolactone and 40 ml. of diethylamine (Eastman Kodak Co. pract.) is heated to 160° in a sealed bomb for four hours. Water and ether are added to the mixture, and three further extractions are made of the aqueous layer with ether. After a final extraction with benzene, the organic layers are combined and washed with eight successive portions of water until a pH of 8 is reached by the wash water. The ether-benzene solution is dried over calcium chloride and gaseous hydrogen chloride is bubbled through the solution. The resultant oil readily solidifies.

After two recrystallizations from ethanol and ether (using Darco), 2,2-diphenyl-5-diethylamino-4-valerolactone hydrochloride is obtained melting at 202-204.5° (open cap. corr.).

*Example III.—2,2-diphenyl-5-dibutylamino-4-valerolactone hydrochloride*

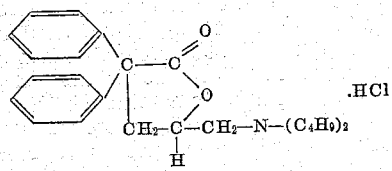

The 2,2 - diphenyl - 5 - bromo-4-valerolactone used as a starting material in the preparation of this compound is described as an intermediate in the preparation of Example I (Step III).

A mixture of 14.0 g. of 2,2-diphenyl-5-bromo-4-valerolactone and 45 g. of dibutylamine is refluxed for two hours. After ten minutes a portion of toluene is added. On addition of ether, 6.3 g. of dibutylamine hydrobromide is precipitated. The filtrate is evaporated at 65° by blowing air into the flask. The residue is dissolved in ether and benzene, washed twice with water, and hydrogen chloride is introduced into the dry organic solution. The resulting oil is converted to the free base with 10% sodium hydroxide, taken up in benzene and distilled. An oil is obtained distilling at 245-260°/10 mm. Attempts to obtain a crystalline hydrochloride of this amine by the usual procedures failed. At length it was discovered that the product could be obtained in a crystalline condition by recrystallization of the hydrochloride from water. About three liters of boiling water are required to dissolve 8 g. of the oily salt. The precipitate is recrystallized from acetone, water and hydrochloric acid to give 2,2-diphenyl - 5 - dibutylamino-4-valerolactone hydrochloride melting at 61.5-63.0° C.

*Example IV.—2,2-diphenyl-5-(N-morpholino)-4-valerolactone hydrochloride*

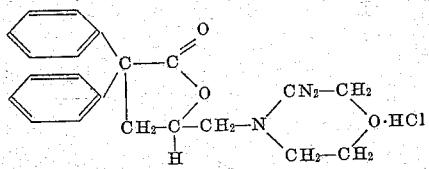

The 2,2 - diphenyl - 5 - bromo-4-valerolactone used as a starting material in the preparation of this compound is described as an intermediate in the preparation of Example I (Step III).

A mixture of 14.0 g. of 2,2-diphenyl-5-bromo-4-valerolactone and 42 g. of morpholine (Eastman Kodak Co. pract.) is refluxed two hours. During the last half-hour, 25 g. of morpholine is removed by distillation. After cooling the residue, ether is added; morpholine hydrobromide is obtained by filtration. The ethereal filtrate is washed with water twice, after which it is necessary to add benzene to the ether to prevent the product from precipitating. The benzene and ether solution is washed three more times with water, separated, and dried over calcium chloride. Dry hydrogen chloride is added to this solution and the precipitate obtained is recrystallized from ethanol and acetone (400 ml. total volume); 2,2 - diphenyl-5-(N-morpholine)-4-valerolactone hydrochloride, melting at 238-240° (open cap. corr.) is obtained.

*Example V.—2,2 - diphenyl-5-(N-piperidino)-4-valerolactone hydrochloride*

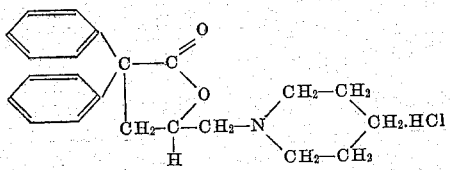

The 2,2 - diphenyl - 5 - bromo-4-valerolactone used as a starting material in the preparation of this compound is described as an intermediate in the preparation of Example I (Step III).

A solution of 14.0 g. of 2,2-diphenyl-5-bromo-4-valerolactone in 40 ml. of piperidine (Eastman Kodak pract.) is refluxed for two hours. After one-half hour, piperidine hydrobromide begins to precipitate. After two hours of refluxing, 22 g. of piperidine is removed by distillation. Ether is added to the cooled residue and filtration gives piperidine hydrobromide. Benzene is added to the ethereal filtrate and the combined solutions are washed with five equal portions of water. After drying the organic layer with calcium chloride, dry hydrogen chloride is passed through the solution. The precipitated amine hydrochloride is recrystallized from ethanol and ether (M. P. 194-196° open cap. corr.). Recrystallization from ethanol and ether gives 2,2-diphenyl-5-(N - piperidino)-4-valerolactone hydrochloride M. P. 195-197° (open cap. corr.).

*Example VI.—2,2-diphenyl-5-(ethyl-β-hydroxyethylamino)-4-valerolactone hydrochloride*

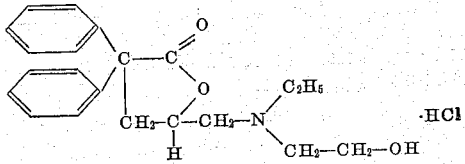

The 2,2 - diphenyl - 5 - bromo-4-valerolactone used as a starting material in the preparation of this compound is described as an intermediate in the preparation of Example I (Step III).

A mixture of 29 g. of 2,2-diphenyl-5-bromo-4-valerolactone, 40 g. of redistilled ethylaminoethanol, and 50 ml. of xylene is refluxed with stirring two hours. On cooling, benzene is added; 200 ml. of water is used to extract the organic layers. This aqueous solution is washed twice with benzene, and the combined organic layers are washed twice with water. The volatile components are removed by distillation at atmospheric pressure up to 150°. The excess xylene and ethylaminoethanol are removed by heating to 200° under a vacuum of 6 mm. The residue is dissolved in ether and hydrogen chloride added. After decanting the ether, the residue is recrystallized from ethanol and ether using Darco decolorizing carbon; light tan crystals of 2,2-diphenyl-5-(N - ethyl-N-β-hydroxyethylamino)-4-valerolactone hydrochloride are obtained melting at 137.5-139.0° (open cap. corr.). A second crop of tan crystals is obtained by reducing the volume of the filtrate.

*Example VII.—2,2-diphenyl-5-(ethyl-β-chlorethylamino)-4-valerolactone hydrochloride*

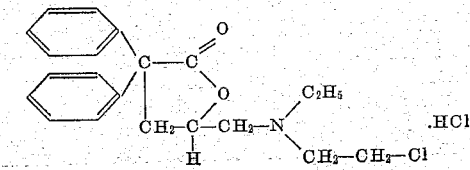

This compound is prepared by reacting 14 g. of the hydrochloride of 2,2-diphenyl-5-(ethyl-β-hydroxy-ethylamino) - 4 - valerolactone hydrochloride with 5.2 g. of thionyl chloride in 35 ml. of dry chloroform. The resulting mixture is warmed for one and one-half hours at 50–55° C., after which the solvent is removed by distillation under reduced pressure, the residual salt being recrystallized from a mixture of ethanol and ether. The crude product is recrystallized from acetone and ether, and finally is recrystallized from alcohol and ether to give crystals which melt at 162–165°.

*Example VIII.—2,2-diphenyl-4-methyl-5-(N-morpholino)-4-valerolactone*

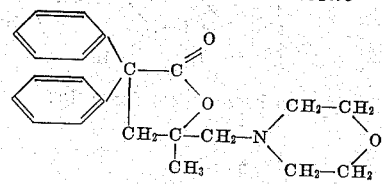

This product is prepared from diphenylacetic acid using the following procedure:

STEP I

A solution of 15.3 g. of diphenylacetyl chloride in 10 ml. of carbon tetrachloride is added slowly to a stirred solution of 6 g. of β-methallyl alcohol, 7 g. of pyridine and 20 g. of carbon tetrachloride, maintained at 0.5° C. After the reaction mixture is allowed to stand overnight it is washed with successive portions of 5% hydrochloric acid, 5% sodium hydroxide and water. The solution is dried over sodium sulfate and filtered, and the solvent is removed by distillation. The residue crystallizes on cooling to yield the nearly pure β-methallyl ester of phenylacetic acid. After recrystallization from petroleum ether (B. P. 60–68°) the compound is obtained as fine, white needles; M. P. 57.5–58°.

STEP II

The β-methallyl ester of diphenylacetic acid so produced is rearranged to form 2,2-diphenyl-4-methyl-4-pentenoic acid of M. P. 120–121.5° C. by the use of the procedure described under Step II in Example I for allyldiphenylacetate.

STEP III

To a solution of 60 g. of bromine in 100 ml. of carbon tetrachloride at 0°, is added 50 g. of 2,2-diphenyl-4-methyl-4-pentenoic acid in portions over a ten minute period. The mixture is stirred continuously and allowed to warm to room temperature slowly. The excess bromine and carbon tetrachloride are removed by blowing air through the flask while heating to 40°. The residue is recrystallized from 400 ml. of acetone; large crystals are obtained, melting at 145–146°. A second fraction is obtained from the filtrate, melting at 137–141°. Recrystallization of the first fraction gives the pure bromolactone which melts at 147.0–148.5°.

STEP IV

A mixture of 15.0 g. of 2,2-diphenyl-4-methyl-5-bromo-4-valerolactone of melting point 145–146°, and 45 g. of morpholine (Eastman Kodak Co. pract.) is refluxed two hours. The excess morpholine is evaporated on the steam bath by blowing air into the flask. The solid is washed with benzene and ether and filtered; morpholine hydrobromide is obtained. The ether-benzene layer is washed with five successive washings of water, dried over calcium chloride, and hydrogen chloride is added. On addition of ether, a precipitate is obtained which on recrystallization from benzene and petroleum ether gives a product melting at 189–194°. By neutralization of the filtrate 1 g. of the free base is obtained (M. P. 146–147°). The remaining hydrochloride is neutralized with sodium hydroxide and the resulting free base is recrystallized from ethanol and water; 2,2-diphenyl-4-methyl-5-(N-morpholino)-4-valerolactone is obtained melting at 146.0–147.5° (open cap. corr.).

The 4-methylbromvalerolactone formed as in Step III above is also formed from the methyl ester of 2,2-diphenyl-4-methyl-4-pentenoic acid by a procedure identical with that used with the acid itself. The 4-methylbromvalerolactone so formed is identical in every way with that formed in Step III above. The methyl ester of the pentenoic acid is formed by reacting the acid with diazomethane in an ethereal solution. Evaporation of the solution leaves the methyl ester, which product may be distilled.

*Example IX.—2,2-diphenyl-4-methyl-5-(N-piperidino)-4-valerolactone hydrochloride*

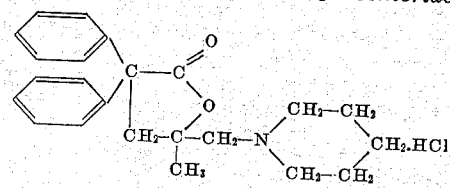

The 2,2 - diphenyl-4-methyl-5-bromo-4-valerolacetone used as a starting material for the preparation of this compound is prepared by either of the two methods described in Example VIII, in which process it was prepared as an intermediate.

A mixture of 15.0 g. of 2,2-diphenyl-4-methyl-5-bromo-4-valerolactone and 45 g. of piperidine (Eastman Kodak Co., pract.) is refluxed two hours. The excess piperidine is removed by blowing air into the flask on the steam bath. The residue is washed into a filter funnel with benzene and ether, and piperidine hydrobromide is collected. The benzene-ether solution filtrate is washed eight times with water until the pH of the wash water is 7.8. After drying the benzene-ether solution over calcium chloride, hydrogen chloride gas is introduced. The resulting precipitate is recrystallized from ethanol and ether; melting point 189–191° open cap. corr. Reduction in volume of the filtrate followed by addition of ether, gives more product of melting point 189–190°. The products are combined and recrystallized from ethanol and ether to give 2,2-diphenyl - 4 - methyl - 5 - (N - piperidino) - 4 - valerolactone hydrochloride melting at 195–196° (open cap. corr.).

*Example X.—2,2-diphenyl-5-dibenzylamino-4-valerolactone*

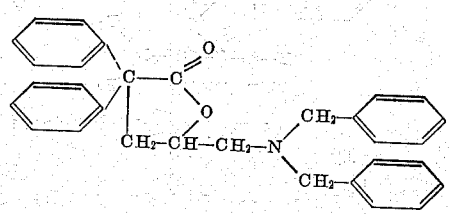

A solution of 9.5 g. of 2,2-diphenyl-5-bromo- 4-valerolactone (prepared as an intermediate in Step III of Example I) in 50 ml. of xylene is refluxed for 10 hours with 13.8 g. of dibenzylamine. The crystalline dibenzylamine hydrobromide is removed by filtration. Acidification of the filtrate by gaseous hydrogen chloride gives more crystals; these are filtered and recrystallized from ethanol and ether to give more dibenzylamine as the hydrochloride. The filtrate from this recrystallization is evaporated to leave as a residue the free base of the desired dibenzylaminolactone. This aminolactone forms a crystalline hydrochloride which decomposes upon contact with ethanol or water to give the free base. This behavior is similar to that found for triphenylamine and its hydrochloride.

*Example XI.—2,2-diphenyl-5-amino-4-valerolactone hydrochloride*

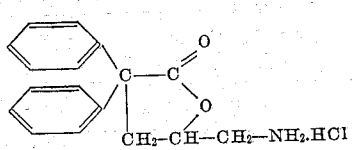

A solution of 5 g. of 2,2-diphenyl-5-dibenzylamino-4-valerolactone (prepared in Example X) in 15 ml. of ethanol is treated with 2 ml. of concentrated hydrochloric acid and debenzylated by well-known procedure using a palladium-on-charcoal catalyst. A temperature of 80 C. at 50 p. s. i. of hydrogen is required to remove both benzyl groups from the molecule. After 80% of the theoretical amount of hydrogen is absorbed the solution is filtered, treated with gaseous hydrogen chloride and ether is added. A hygroscopic precipitate of the desired amine hydrochloride results.

In the above specific examples the compounds according to this invention are produced as their hydrochloride salts. However, it will be apparent from the foregoing general disclosure that they may as readily be produced as other halide salts or in the form of free bases. Again, it will be apparent that when produced in the form of halide salts, the free bases may be obtained from the salts by well known procedure for recovering bases from their salts.

As will be apparent, the inorganic and organic salts of the compounds according to this invention and which salts are contemplated as within the scope of this invention will be formed from the free bases, using the desired acid, by usual well known procedure for the formation of salts from bases.

What is claimed is:
1. A compound of the class consisting of a free base and its acid addition salts, the free base having the formula:

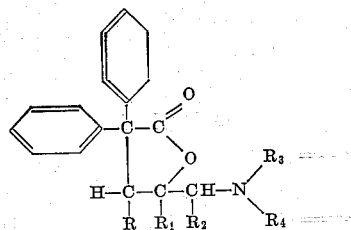

in which $R$, $R_1$, and $R_2$ are selected from the group consisting of hydrogen and methyl radicals, not more than one of said radicals being methyl; $R_3$ and $R_4$ are selected from the group consisting of hydrogen, alkyl having not in excess of 8 carbon atoms, monohydroxyalkyl having not in excess of 8 carbon atoms, monohaloalkyl having not in excess of 8 carbon atoms, benzyl, and when taken together, form with the nitrogen to which they are attached a member selected from the group consisting of piperidino and morpholino.

2. A compound having the following structure:

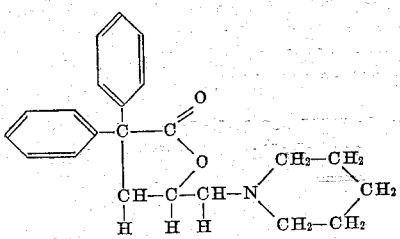

3. A compound having the formula:

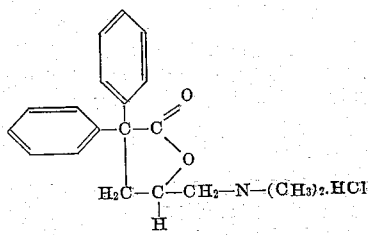

4. A compound having the formula:

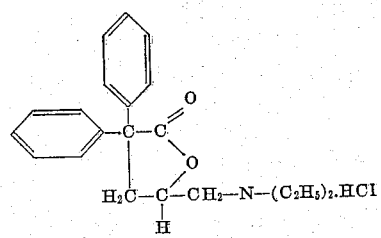

5. A compound having the formula:

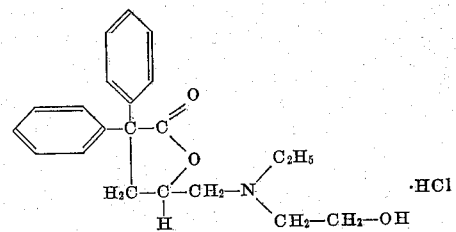

6. A compound having the formula:

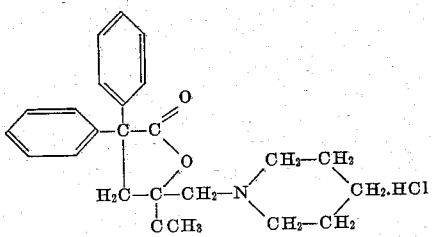

7. The method of preparing aminovalerolactones which comprises reacting a 2,2,-diphenyl-4-pentenoic acid with elemental halogen in an inert solvent to form a halovalerolactone, and reacting the halovalerolactone with an amine at a temperature of about 50–100° C. to form an aminovalerolactone, said amine having the formula

in which $R_1$ and $R_2$ are selected from the group consisting of hydrogen, alkyl having not in excess of 8 carbon atoms, mono-hydroxyalkyl having not in excess of 8 carbon atoms, mono-haloalkyl having not in excess of 8 carbon atoms, benzyl, and when taken together, form with the nitrogen to which they are attached a member selected from the group consisting of piperidino and morpholino.

RICHARD T. ARNOLD.
GLENN E. ULLYOT.

References Cited in the file of this patent

UNITED STATES PATENTS

| Number | Name | Date |
| --- | --- | --- |
| 2,490,937 | Weston | Dec. 13, 1949 |
| 2,500,714 | Spielman | Mar. 14, 1950 |